July 25, 1939.　　R. H. LAWSON ET AL　　2,167,390
WRAP STRIPE KNITTING MACHINE
Filed May 26, 1936　　9 Sheets-Sheet 1

INVENTORS:
ROBERT H. LAWSON,
ISAAC H. C. GREEN,
BY Roy F. Lovell
ATT'Y.

July 25, 1939.  R. H. LAWSON ET AL  2,167,390
WRAP STRIPE KNITTING MACHINE
Filed May 26, 1936   9 Sheets-Sheet 4

INVENTORS:
ROBERT H. LAWSON,
ISAAC H. C. GREEN,
BY Roy F. Lovell,
ATT'Y.

July 25, 1939.  R. H. LAWSON ET AL  2,167,390
WRAP STRIPE KNITTING MACHINE
Filed May 26, 1936   9 Sheets-Sheet 5

INVENTORS:
ROBERT H. LAWSON,
ISAAC H. C. GREEN,
By Roy F. Lovell,
ATT'Y.

INVENTORS:
ROBERT H. LAWSON,
ISAAC H. C. GREEN,
BY Roy F. Lovell
ATT'Y.

INVENTORS:
ROBERT H. LAWSON,
ISAAC H. C. GREEN,
By Roy F. Lovell
ATT'Y.

July 25, 1939.   R. H. LAWSON ET AL   2,167,390
WRAP STRIPE KNITTING MACHINE
Filed May 26, 1936   9 Sheets-Sheet 9

FIG. 31.

INVENTORS:
ROBERT H. LAWSON,
ISAAC. H. C. GREEN,
BY Roy F. Lovell
ATT'Y.

Patented July 25, 1939

2,167,390

UNITED STATES PATENT OFFICE 2,167,390

WRAP STRIPE KNITTING MACHINE

Robert H. Lawson, Pawtucket, and Isaac H. C. Green, Central Falls, R. I., assignors to Hemphill Company, Central Falls, R. I., a corporation of Massachusetts Application May 26, 1936, Serial No. 81,896
In Canada June 14, 1935

16 Claims. (Cl. 66—135)

The invention herein disclosed concerns knitting machines for knitting fabric in which pattern effects are made by wrap striping. In general the method of wrap striping and the mechanism which has been shown are similar to those disclosed in Patent No. 1,702,608, and it is an object of the invention to greatly increase the size of a particular striped outline or design which may be produced on this type of machine. This is to be done with no increase in the size of the wrapping head or other parts which would normally only produce a figure based upon the maximum number of needles which might be raised within the segment swept by one wrapping finger. The invention is very simple in structure and does not interfere with any of the other parts or functions of the knitting machine nor does it sacrifice any of the effectiveness and precision of wrapping which have been characteristic of the original device as illustrated in the patent cited.

With the wrapping mechanism which has been disclosed in the previous case which issued into United States Patent 1,702,608 the eccentric wrapping head has been arranged to overlap a certain segment of needles so that a particular guide or finger carrying one individual thread is capable of wrapping that thread about a limited number of needles only. Within this segment of needles which may be wrapped by any single finger, it is possible to select and raise one or more of the needles to wrap the yarn thereabout, but it is not possible to go beyond a definite safe number of needles which will always wrap positively by this finger in any one course or courses. For the hosiery machine of normal gage and size this maximum segment of needles is usually about 18 in number. For these reasons the size of any figure which is to be outlined with wrapped loops is limited to the number of needles which may be included within the segment wrapped as above explained; in other words, a diamond or other figure may be made similar to that shown in Fig. 2 having its extent in coursewise direction limited to not over 18 wales. For a great many patterns it is desirable to form outlines of a larger size.

Figures 1, 2, 3, 4, 5, 6, 7:
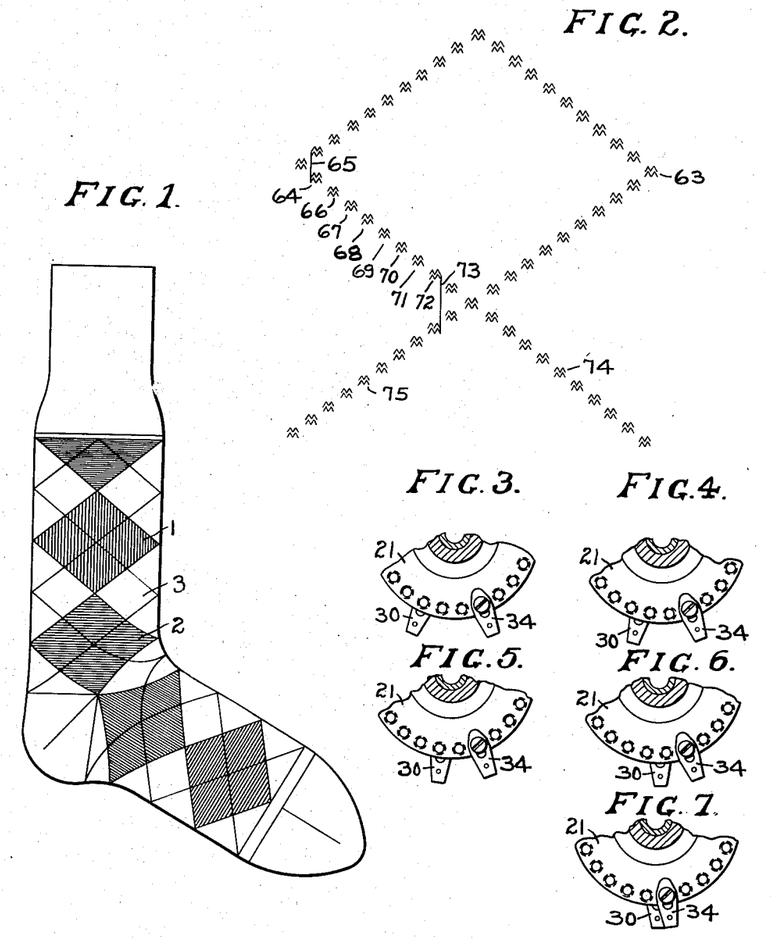
Fig. 1 shows a typical stocking having diamond shaped outlines which have been formed running through other patterned portions of the stocking produced by reverse plating; this is commonly called the "Argyle" pattern.
Fig. 2 is an enlarged view illustrating diagrammatically the operation throughout one complete diamond.
Figs. 3 through 7 show a fragment of the wrapping discs and their fingers, the fingers being shown in five successive positions.

The stocking illustrated in Fig. 1 is of conventional construction in all respects except the proportions of the diamonds which are included between the diagonal lines. The stocking illustrated has large diamond shaped formations of contrasting colors, one color being illustrated at 1, another color at 2 and still another color at 3. These large diamond formations have been produced by reverse plating and the wrap stripe pattern is superimposed upon this base design in the form of diamond shaped outlines of a contrasting color, there being four of these wrapped outlines within each basic figure formed by plating or reverse plating. It is not essential that the ornamentation by needle wrapping be in addition to other pattern work of the plating or reverse plating type, but the wrapping may be used alone or in conjunction with any other suitable pattern work.

In Fig. 2 we have illustrated one and a half of these wrapped outlines showing the number of wales included and the number of courses. It can be seen that each side of one of these individual diamonds will be formed on 22 needles or comprise 22 wales and that for each two consecutive courses a pair of needles is raised, the pattern stepping over two needles after each two consecutive courses to form the sloping side of the figure. It is to be understood that we are not to be limited to any particular number of needles which may be raised to take wrap threads in a particular course, nor do we have to step down two courses at all times since other numbers of needles and/or courses may be used in which case the figure will vary in shape from that which has been shown. A particular pattern is to be described herein merely for the purpose of illustrating the invention and one figure which may be produced thereby. It is necessary to raise needles selectively so that they may be wrapped with one of the wrap threads which is provided, and we have shown mechanisms for raising selected needles to one or the other of the different levels. At one of the levels needles will take yarn from the short wrapping fingers and at the other level will take yarn from the long fingers. These fingers and their manipulation within the wrapping head whereupon they are attached as well as the manner of raising needles to different selective levels will be described hereafter. After a detailed description of the mechanism has been given we will explain precisely how the same functions to produce the pattern shown in Figs. 1 and 2.

Figure 8:
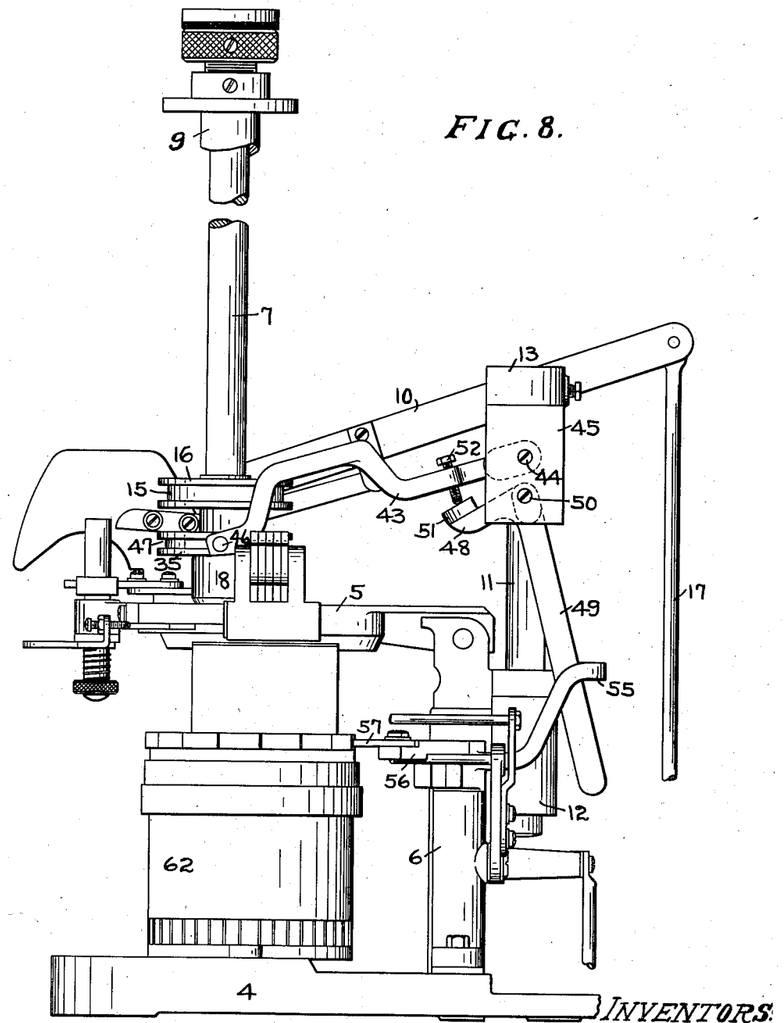
Fig. 8 is an elevation showing a general view of the wrapping mechanism as applied to a knitting machine.
Figure 9:
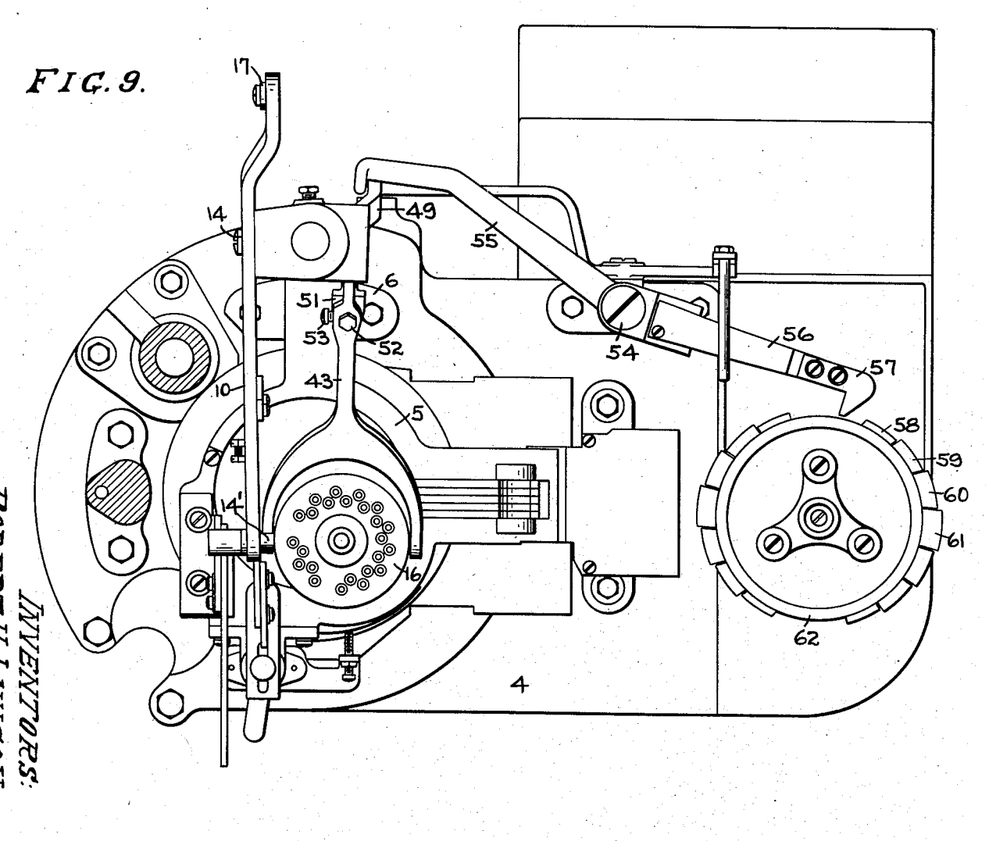
Fig. 9 is a plan view illustrating the same part of the machine shown in Fig. 8.

Referring to Figs. 8 and 9 we have shown portions of a knitting machine including a circular base 4, a latch ring 5 pivoted in the usual manner to the post 6 and projecting downwardly within this latch ring and eccentrically to the center of the ring, cylinder, etc., a spindle 7 carrying at its lower end a wrapping head generally shown at 8 provided for rotation within a bearing 9 and other bearings not illustrated in this case since they are shown in the patent which has been referred to. This spindle is rotated at the same speed as which the needle cylinder of the machine is rotated all in a manner disclosed in the prior patent, and is to be moved vertically out of active cooperation with the needles by means of a lever 10 pivoted on an extension of the carrier ring post 6. The extension 11 is fast within a bracket 12 extending from said post and carries at its upper end a collar 13 to which said lever 10 pivots at 14. This lever is provided with a stud 14' which engages within a groove 15 in a collar 16 whereby it may raise said spindle and its assembly at such times as a rod 17 is moved downwardly by pattern mechanism like that described in the patent referred to. The spindle and its attendant parts are raised during the knitting of the heel and toe of the stocking. A creel is also attached to rotate with said spindle and carries thereon a supply of wrap yarns varying in number and color according to the stocking which is to be produced.

Referring to Figs. 10-21 we will describe in detail the wrapping head by means of which it is possible to wrap more needles with one finger than would normally be included within the segment which that finger could wrap without being displaced relative to the head itself, and also to include a greater number of needles with the finger which is adjacent, none of these needles being the same needles and both fingers wrapping the same figure. A spindle 18 is permanently attached at the lower end of the rotating spindle 7 to turn therewith. The collar 16 is permanently secured to this spindle by means of a set screw or other suitable means and has a plurality of porcelain yarn guides 19 set therein for leading the wrap yarns downwardly to the fingers, the number of guides corresponding to the maximum number of wrap yarns which are to be used. The spindle 18 is enlarged at its lower end and is hollow for the purpose of allowing a tubular extension 20 on wrapping disc 21 to move freely therein. Another wrapping disc 22 has been provided directly beneath disc 21 and has a stem 23 which projects upwardly within the bearing provided by 20 and thus the disc 21 is free to be rotated relative to spindle 18 and disc 22 is also free to be rotated in either direction independently of the rotation of spindle 18 or of disc 21. The lower tubular end of spindle 18 has been slotted circumferentially at 24, Figs. 12, 13, 15 and 16, and a stud 25 has been threaded into a tapped hole in element 20, this stud being free to move within the slot 24 but preventing the disc 21 and its extension 20 from moving axially of the spindle 18. The tubular extension 20 has also been slotted at 26, Figs. 12, 13 and 16, this slot being at the same vertical height as that in spindle 18. Another stud 27 has been threaded into the stem 23 of lower wrapping disc 22 and projects outwardly through both slots 24 and 26 to allow the disc to be moved circumferentially in a limited arc but to prevent axial movement. The stem 23 has been tapped out at its lower end at 28 for the reception of a set screw 29 which is to lock stud 27 against accidental movement.

These wrapping discs are provided with a plurality of fingers illustrated in Figs. 18 to 21, which fingers are of two different lengths. The short fingers 30 are attached by means of suitable screws to the lower disc 22, each finger being provided with a slot 31 through which the said screw is passed to provide a slight radial adjustment in positioning these fingers. Each finger has a small hole 32 and another small hole 33 through which the wrap yarn is led to be guided to the needles. The long fingers 34 are identical in their general dimensions and construction with the exception of their length and these fingers have been secured to the upper disc 21. As previously mentioned needles which are selected for wrapping are selected in such a manner that some are raised to one elevation and others to a still higher elevation, those raised to the lower level being wrapped by the long fingers 34 and those to the higher level being wrapped by the short fingers 30. There is sufficient difference in these two levels so that needles raised to the higher level and which would tend to be wraped by the long fingers as well as the short ones will be wrapped below the latch by said long fingers and thus, as far as the fabric is concerned, do not appear to be wrapped at all by these long fingers. In other words, there are two wrapping levels and two different length fingers for wrapping at these levels, the function of one not being dependent upon the other in any way.

A second collar 35 having an extension 36 is located just below collar 16 and is slidable vertically upon the outer bearing surface of spindle 18. A set screw 37, Fig. 15, has a conical end which projects into a groove or key way 38 cut in spindle 18. This set screw and key way prevent rotary movement of the collar but do not interfere with its vertical movement. The extension 36 is provided with two angular slots which act as cams upon the outer ends of studs 25 and 27. Stud 25 is actuated to move circumferentially or to be held in a particular circumferential position depending upon whether it is engaged by the lower angular portion 39 or the upper vertical portion 40, Fig. 17. Stud 27 is likewise guided within a vertically extending portion of its cam slot 41 or in an angular portion 42 thereof. It should be noted that the angular portion 39 of one slot is oppositely disposed relative to portion 42 of the other slot, in other words, when collar 35 is actuated by a means presently to be described, one of the studs will be maintained stationary while the other is moved and vice versa.

The particular scheme which has been used for the pattern we are describing in this case, but not essentially the only one which could be used, provides for movement of collar 35 in five different steps, these steps being divided into four angular movements on the part of the lower disc 22 and one movement of the upper disc 21. This means that for the production of converging sides of one diamond as illustrated in Fig. 2, the side which is formed on needles wrapped by the short fingers will be produced by four different shogging movements of those short fingers, and the other side by one movement of the long fingers in an opposite direction. These oppositely directed shogging movements will provide for wrapping several additional needles by each group of fingers which would be impossible if the fingers were incapable of being shogged at all, or if all fingers had to be shogged in one direction. Figs. 3, 4, 5 and 6 show the four different movements of the short fingers 30 while long fingers 34 remain relatively stationary as far as the entire assembly is concerned; at this time stud 27 is being cammed in slot 42 while stud 25 is held within slot 40. In Fig. 7 the finger 30 is not moved since stud 27 is now engaged by the vertical slot 41, but since stud 25 is to be engaged by slot 39, the upper disc and long fingers will be moved to the position shown which movement is in the opposite direction from the four movements which were illustrated in Figs. 3-6. This illustrates the maximum separation of adjacent long and short fingers, the closest position which said fingers occupy and the intermediate steps.

Referring to Figs. 8 and 9 we will describe the manner in which collar 35 is moved vertically for the purpose of shogging the fingers as described. A forked lever 43 is pivoted at 44 on a bracket 45 which is fixed to the extension 11. The forked end of this lever has studs 46 which engage in the groove 47 which is cut in collar 35. A bell crank lever having an arm 48 and a much longer arm 49 is pivoted at 50 just below pivot point 44 of the forked lever. The arm 48 has a flattened portion 51 which engages under an adjustable screw 52 threaded within lever 43. This screw 52 is held permanently in an adjusted position by means of a locking screw 53. At 54 another lever extending horizontally has one hooked arm 55 which engages behind 49 and another arm 56 which carries a hardened cam follower 57 at its outer end. This follower 57 is adapted to engage upon a series of cams 58, 59, 60 and 61 fixed to a cam drum 62. This cam drum is preferably the same drum which is used to control the pattern mechanism which selects needles, but need not be the same drum since any suitable drum might be employed which could be ratcheted in a certain timed relation to present the cams as desired beneath said follower 57. When the follower 57 is bearing upon the surface of drum 62 the long and short fingers 30 and 34 will be out in the position of Fig. 3 and as said follower rises up on each sucessive cam 58—61, these fingers will be moved to the position shown in Figs. 4-7 respectively. This corresponds to a movement from wrapping the widest portion of the diamond to the narrowest point or intersection of diamonds, and as said follower falls off upon lower cams, the fingers will move reversely through the steps illustrated in Figs. 3-7 to go from the intersection of diamonds to the widest portion of a diamond, Fig. 2. By means of the adjusting screw 52 it is possible to very accurately gage the movement of collar 35 and the cam slots on the depending extension thereof so that these steps of shogging will occur at the proper instant.

With reference to Figs. 2-7, 9 and 17 we will describe the operation of wrapping a complete diamond according to the invention. The diamond illustrated has wrap loops on two adjacent needles in a course and these same two needles are raised for two courses, these groups of four wrap loops and others converging or diverging, as the case may be, to form the sides of the figure. Beginning at the widest portion of the diamond the needles at the right hand corner indicated at 63 are wrapped for two consecutive courses by the long finger 34. These needles would be raised high enough to be wrapped by said long finger only and would not take any of the wrap yarn which is feeding from an adjacent short finger. At the opposite side of the diamond the needles in the wales indicated at 64 are being wrapped on the next two consecutive courses by finger 30 which is a short finger. The short finger 30 did not wrap any needles during the two courses corresponding to those in which loops at 63 were wrapped so that a short float 65 would appear on the back of the fabric extending down from the last pair of loops which were wrapped on those same needles. At this time the follower 57 is in the position shown in Fig. 9 and long and short fingers are spread to the position of Fig. 3. The next two consecutive courses are knitted whereupon four more wrap loops 66 will be formed at which time follower 57 will move up onto cam 58 and finger 30 will move one step into the position shown in Fig. 4. At this movement the wrapping in wales at 67 and 68 is done, and, of course, the long finger 34 is still wrapping corresponding parts of the design on the right hand side of the figure.

Another movement of finger 30 is now brought about as cam 59 passes under follower 57 so that the fingers will assume the position of Fig. 5, the short finger wrapping wales at 69 and 70 and the long finger wrapping in four corresponding courses on the opposite side. In like manner finger 30 is given one more movement by means of cam 60 so that when in the position of Fig. 6 that finger will wrap the wales in which loops 71 and 72 appear. The long finger 34 will have wrapped 18 wales without any movement relative to the spindle upon which it is rotating. This is the practical limit to the number of wales that can be wrapped by this finger without shogging it relative to its spindle. As the cam 61 passes under follower 57 the finger 34 will be moved from the position shown in Fig. 6 to that shown in Fig. 7 wherein both fingers are closely adjacent each other. In this position finger 34 will wrap the necessary loops in the 6 wales at the center of the figure, and the short finger will not wrap any needles during this interval so that its yarn will float as shown at 73.

Figure 10:
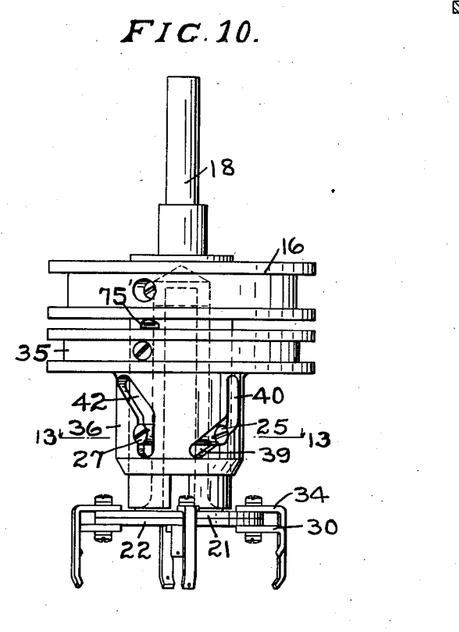
Fig. 10 is an elevation of the wrapping head which is attached to the spindle.
Figure 11:
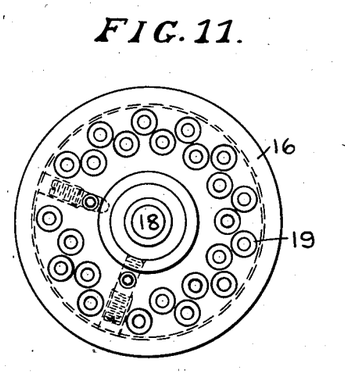
Fig. 11 is a plan of the head shown in Fig. 10.
Figure 12:
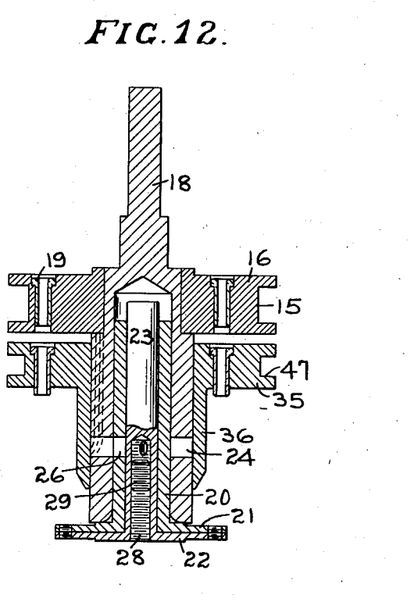
Fig. 12 is a sectional view taken through the vertical center line of Fig. 10.
Figure 13:
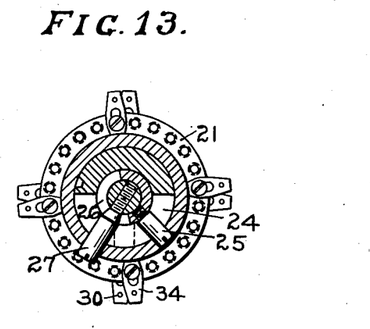
Fig. 13 is a section taken on line 13—13 of Fig. 10.
Figure 14:
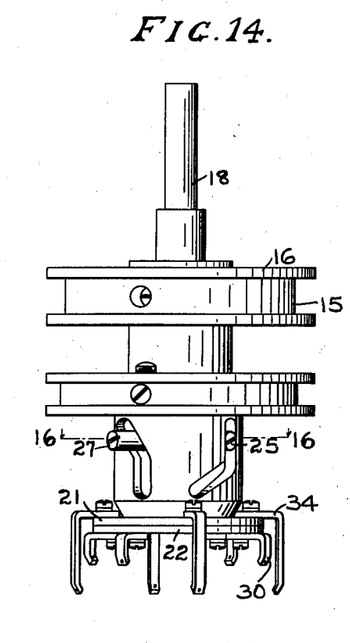
Fig. 14 is a plan view corresponding to Fig. 10 only showing the fingers in opposite, extreme open position.
Figure 15:
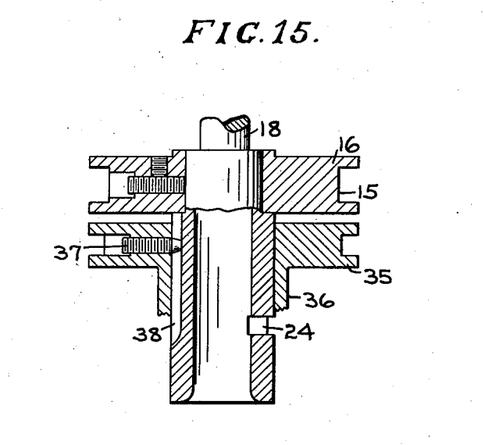
Fig. 15 is a section showing certain parts of the wrapping head in greater detail.
Figure 16:
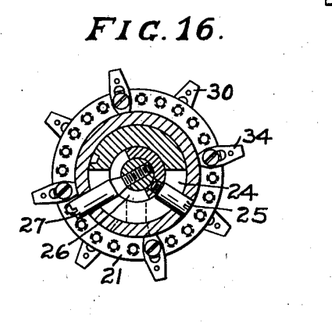
Fig. 16 is a section taken on line 16—16, Fig. 14, and similar to that shown in Fig. 13 but showing the fingers in their extreme open position.
Figure 17:
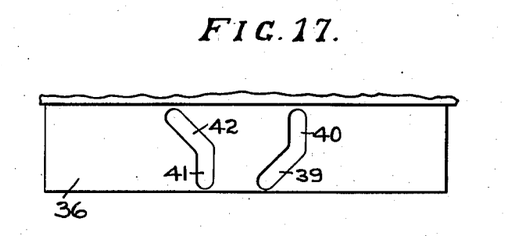
Fig. 17 is a developed view showing the cam slots in the operating sleeve which changes the position of the fingers.
Figure 18:
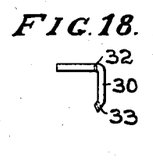
Figs. 18 through 21 illustrate the wrapping fingers in detail.
Figure 19:
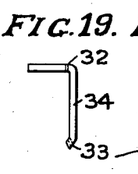
Figure 20:
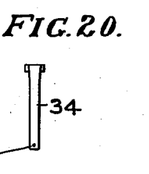
Figure 21:
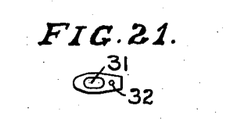

This completes the formation of two sides of a diamond and it is by the reverse process that the diverging sides generally indicated at 74 and 75 will be formed. It is to be understood that we have described only one pattern and have used a particular number of needles as the maximum which may be wrapped without shogging although these may vary greatly with the desires of the knitter and with various sizes and gages of hosiery machines. The cam set-up has provided 5 different steps, and for this pattern we have divided these steps in the manner described, however, other divisions might be resorted to in case it was necessary to provide the machine with more or with fewer cams. As shown in Fig. 10 the collar 35 has an adjusting screw 75' projecting from the top portion thereof which may be used to regulate the extent of upward travel of the collar as said screw stops against the collar 16. The travel in the opposite direction is limited by the height of the cams 58—61. This description is illustrative of only one embodiment of the invention.

Figure 22:
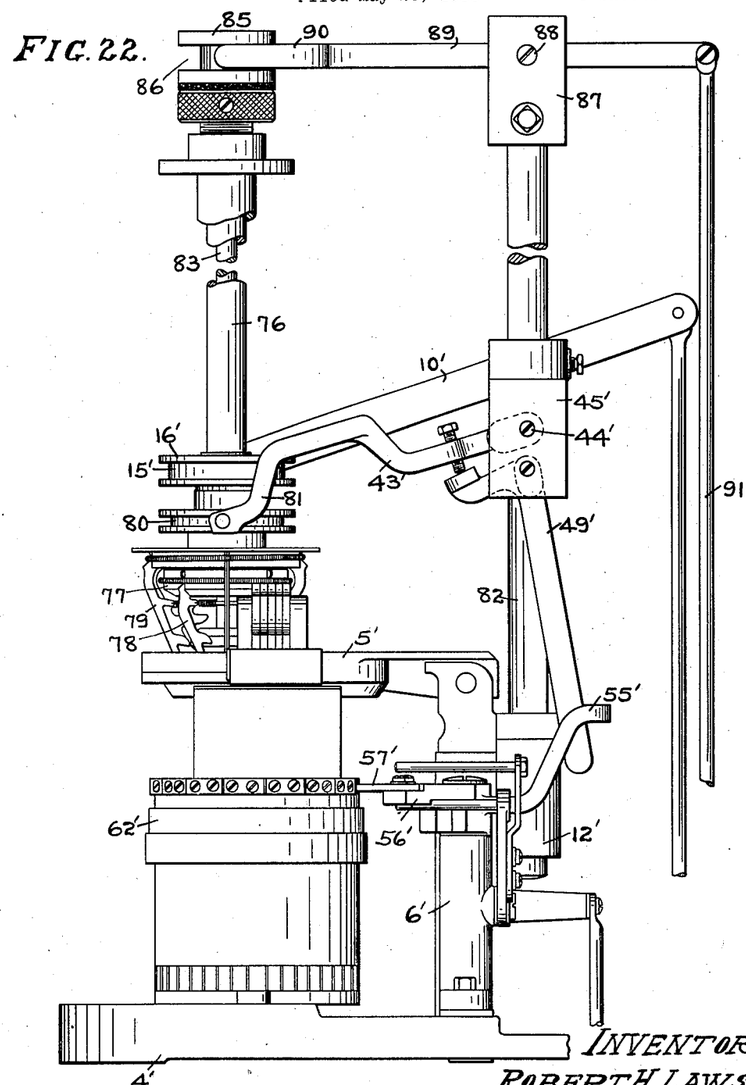
Fig. 22 is a general view showing the modified form of wrapping head applied to a knitting machine.

Referring to Fig. 22 we have shown a wrapping head which is somewhat similar to that first disclosed but which has certain other advantages in addition to those of the first construction. Corresponding parts of the knitting machine which are illustrated in this Fig. 22 have been indicated by similar numerals with primes and will only be briefly referred to in this description. The circular base 4', latch ring 5', post 6', bracket 12' are all identical with the corresponding parts illustrated in Fig. 8, and a tubular spindle 76 carries at its lower end a wrapping head generally indicated by numeral 77 which has long fingers 78, 78' and short fingers 79, 79' all to be described in greater detail hereafter. A collar 16' is operated at the proper intervals for the purpose of raising the entire wrapping mechanism away from the needles during reciprocating knitting. A second collar 80 for the purpose of shogging long and short fingers in opposite directions when desired is controlled by means of a lever 43' having a forked end 81, this lever being pivoted at 44' on a bracket 45' attached to an elongated post or extension 82 extending upwardly at the back of the machine. A lever 49' is operated by means of a two armed lever 55', 56' which has a follower 57' to be engaged by certain cams mounted on a drum 62' corresponding precisely with the same mechanism which was described with reference to Figs. 8 and 9.

Figure 23:
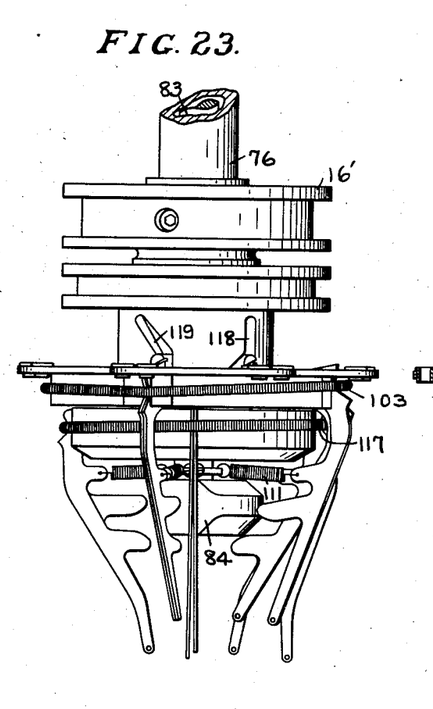
Fig. 23 is an elevation showing this modified wrapping head.
Figure 24:
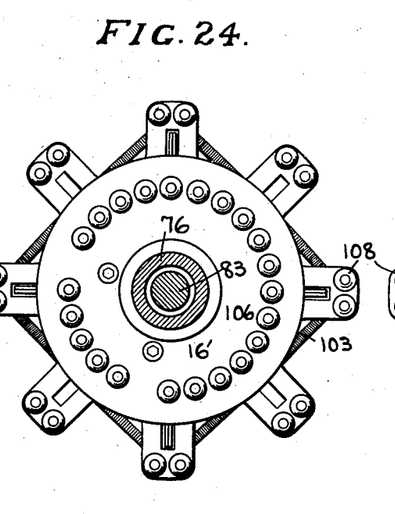
Fig. 24 is a plan view of Fig. 23.
Figure 25:
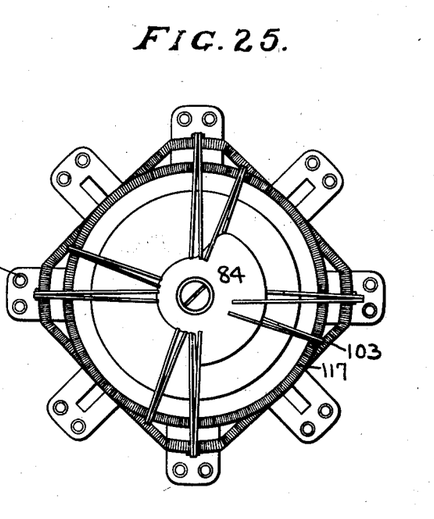
Fig. 25 shows the mechanism of Fig. 23 as seen from below.

The hollow spindle 76 has a second spindle 83 extending along the interior thereof which carries a cam 84, Fig. 23, at its lower end for a purpose presently to be described. This spindle 83 has a collar 85 fixed to the upper end thereof which collar has a groove 86 with two opposite sides therein flattened. The post 82 extends upwardly and carries at the topmost end a block 87 which has pivoted at 88 a lever 89. This lever 89 has a forked end 90 which engages within the groove 86 and said forked portion is of proper dimensions to prevent the collar and necessarily spindle 83 and its cam from rotating as it engages the flattened sides within said groove. At the opposite or free end of lever 89 we have connected a depending rod 91 which extends downwardly to be connected to other devices (not shown) which transfer movements to it according to a predetermined pattern requirement. The purpose of this vertical movement of spindle 83 will appear as the disclosure progresses.

Figure 26:
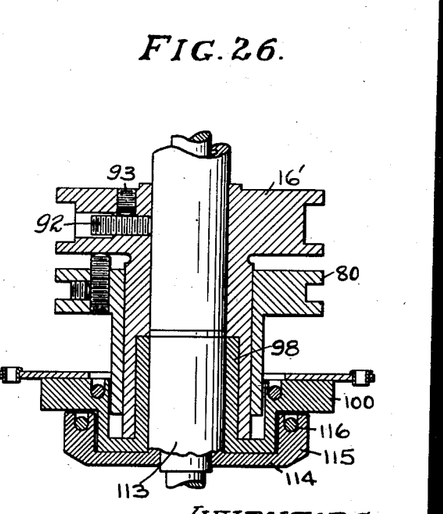
Fig. 26 is a section showing certain parts of this head in detail.
Figure 27:
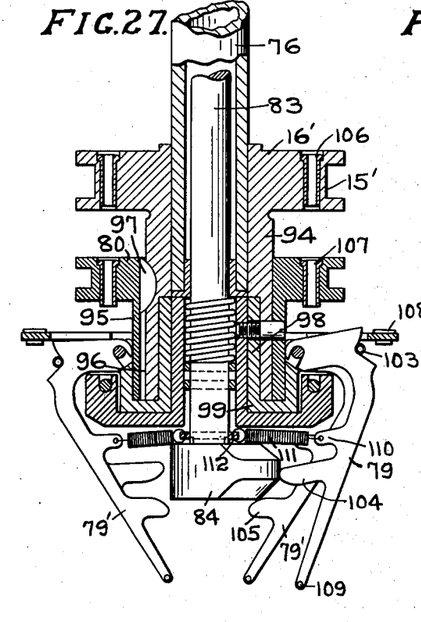
Fig. 27 is a sectional view taken along the vertical center line of Fig. 23 showing the manner in which short fingers are attached and also the operating cam in raised position.
Figure 28:
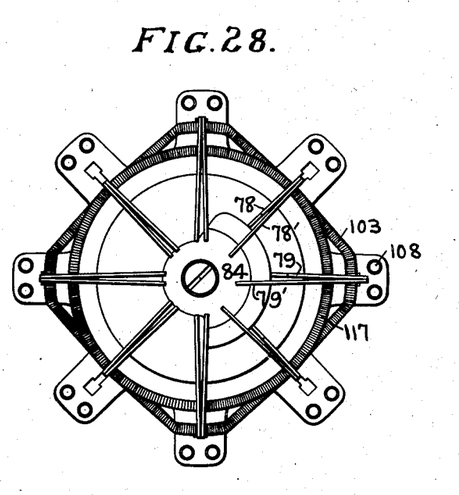
Fig. 28 corresponds to Fig. 25 but shows the fingers in widely separated relationship.
Figure 29:
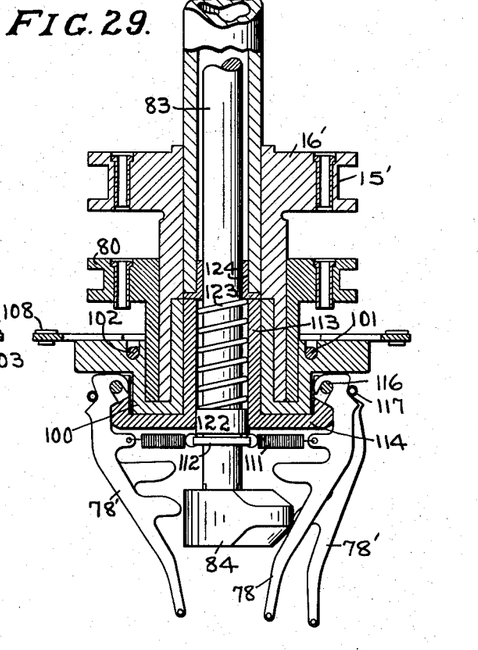
Fig. 29 is a section corresponding to that shown in Fig. 27, but showing the long fingers and the cam in lower position.
Figure 30:
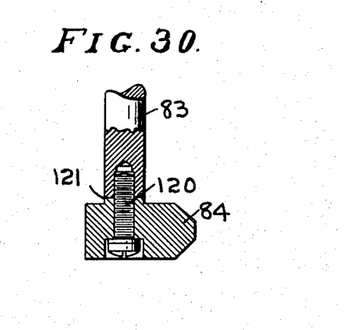
Fig. 30 is a detail showing how this cam is attached to its spindle.

Referring to Figs. 23–30, and especially Figs. 27 and 29, it will be seen that hollow spindle 76 has attached thereto a collar 16' grooved at 15'. This collar is secured to said spindle by means of one or more set screws 92 and locking screws 93. Said collar extends downwardly at 94, its outer surface forming a bearing for a second collar 80 which has a downwardly projecting extension 95 having two angular slots or cam drums therein which correspond to the slots 39—42, Fig. 17, of the first modification described. The collar and its extension have a key way 96 cut therein which works upon a Woodruff key 97 set into element 94. This key and key way prevent the lower collar from rotating upon the spindle but allow it to move axially.

The sleeve 94 has been bored out inside at its lower end to form a bearing for a second sleeve 98 which is flanged out at its lower end at 99 and then extends upwardly at 100 to form a bearing and guiding portion for short fingers 79. We are referring to these fingers 79 as the short fingers although their longest dimension is greater than that of the fingers 78 which we choose to call the long fingers. This has been done since fingers 78 project downwardly at their needle wrapping end farther than fingers 79 and thus, are in effect the long fingers when considered with comparison to the finger 34 of the first form of invention described. A circumferential groove 101 is cut around the upper edge of this extension 100 and forms a bearing or connecting pivot for fingers 79 which have hooked upper ends to engage with a wire 102 inserted in said groove. At properly spaced points radial slots have been cut within which the upper ends of these fingers 79 have been inserted. The fingers have a working fit in these radial slots and are maintained from flying outwardly by means of a spring 103 which engages within a V shaped part of the finger. In each slot we have provided two fingers which are identical except for a butt on each finger, this butt being at one level on one of the fingers and at a different level on the companion finger. The finger 79, Fig. 27, has a butt 104 which is shown engaging with cam 84 to be pushed outwardly for purposes of overlapping a segment of needles and wrapping the same. The adjacent finger 79' has its butt 105 at a lower level so that it is not engaged by cam 84. In practice each pair of fingers is provided with two threads of different colors and according to the position of cam 84, it is possible to wrap certain selected needles with either colored thread. These wrapping threads are placed on a creel (not shown) but which is rotatable with the spindle 76, and these threads are passed downwardly through eyelets 106, 107 and 108 to the small feeding eyelet 109 in the end of the fingers. Each finger is provided with a connecting portion 110 at which is attached a spring 111 secured at its inner end to a ring 112 which fits loosely about spindle 83. These springs maintain the fingers inwardly against the cam 84 so that whichever finger is not to be engaged by the operating portion of said cam will be drawn downwardly to a position where it can not overlap the needle circle. In case cam 84 is moved to an intermediate position between that of Figs. 27 and 29, neither finger will be moved outside the needle circle.

The long fingers 78, 78' are provided with similar lugs for attachment of springs to draw these fingers inwardly toward the center, and have butts projecting therefrom to engage with cam 84. These fingers are also arranged in pairs, one of each pair having a butt at the upper level and the other having a butt at the lower level. As shown in Figs. 26 and 29, a second sleeve 113 bears within sleeve 98 and projects outwardly in a flange or web 114, then upwardly at 115 being grooved for the reception of a wire ring 116 upon which the upper ends of said long fingers are pivoted. A wire spring 117 serves to retain said fingers from being displaced outwardly or away from their connection with element 116. As illustrated in Figs. 23, 24, 25 and 28 the portions of this wrapping head which carry the long fingers 78 and the short fingers 79 are held in such a position by means of cam slots 118 and 119, Fig. 23, that when collar 80 is in one extreme position the fingers will approach each other fairly closely, but when moved to the opposite position cam slots 118, 119 will function upon pins projecting outwardly through radial openings in sleeves 98 and 94, the said fingers will be separated into the position shown in Fig. 28. The operation of collar 80 and its depending sleeve portion 95 which contains the cam slots heretofore mentioned is similar to the operation of corresponding parts which were precisely described in the first part of this disclosure, and for this reason, will not be described in great detail at this point.

During the operation of the machine, spindle 76 and the attached members of the wrapping head rotate at the same angular speed as the needle cylinder and fingers 78 and 79 when projected outwardly by cam 84 will overlap the needle circle and feed wrap yarns to such needles as are raised to the proper heights. Cam 84 is attached to the lower end of spindle 83 in such a manner that it can not be rotated thereupon by means of a screw 120. The cam is provided with a flattened key portion 121 which engages within a cooperating slot in the lower end of the spindle. A collar 122 has been attached by a pin to spindle 83 and a spring 123 is under compression between that collar and another flanged bushing 124 set under hollow spindle 76. This spring tends to urge the inner spindle and its cam into the lower portion illustrated in Fig. 29 except at such times as pattern mechanism (not shown) acts upon lever 89 to raise said cam into intermediate or upper position. By means of the cams on drum 62' and the connecting levers the fingers 78 and 79 may be shogged away from each other or toward each other to produce wrapped figures which are of greater size than could be produced otherwise all in a manner hereinbefore described. Depending upon the position of cam 84 it is also possible to select which of the fingers, either long or short, is to wrap in a particular course thus giving a choice of color in addition to what the first form of the invention made available.

Figure 31:
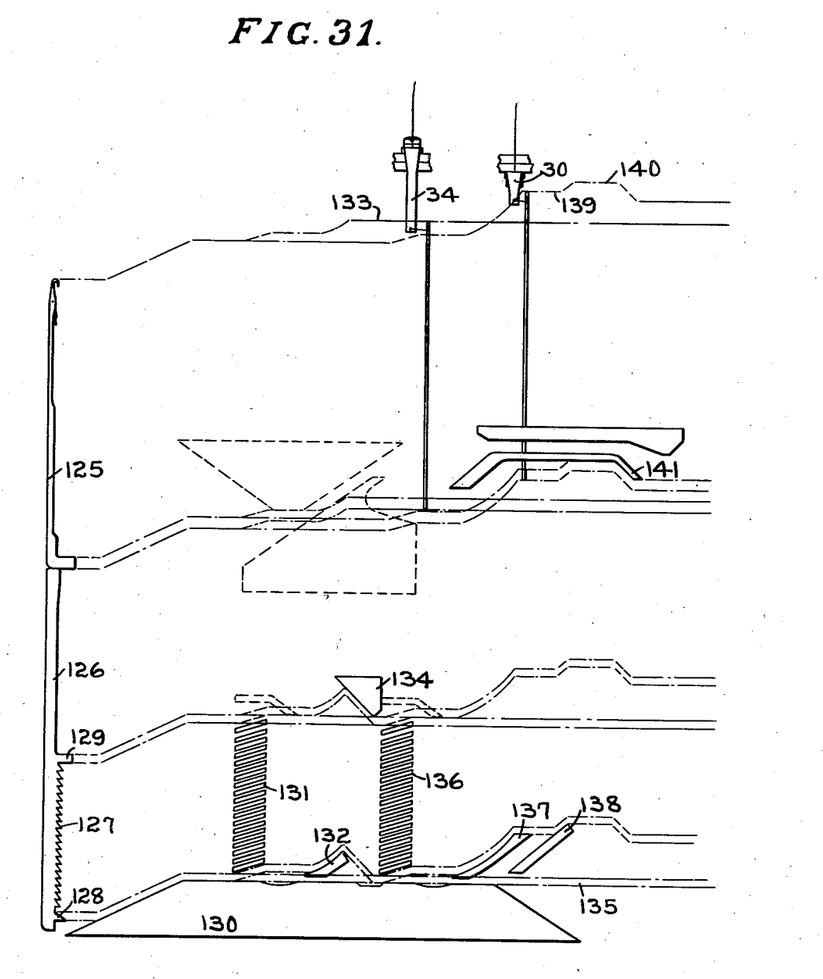
Fig. 31 is a diagrammatic view showing the manner in which needles are selected and raised for receiving the wrap yarns.

Referring to Fig. 31 we have shown the pathway which jacks take as they pass through the selecting plungers and also the manner in which needles are raised so that they may be wrapped by one or the other of the wrapping fingers. A needle 125 is shown resting upon a jack 126 which would be placed in the same slot therewith. The jack 126 has a series of saw-tooth butts 127 for selection purposes, a large saw tooth butt 128 for raising said jack whenever it is selected, and a third butt 129 for returning the jack to lower position. The butts 127 are frangible or may be removed by any convenient method as desired. As the jack rides up cam 130, by means of any one of the plungers 131 which are movable into or away from active position by manual or automatic pattern means, the said jack will be raised to engage its butt 128 upon cam 132, in case the jack has a butt 127 in alignment with one of the plungers which happen to be selected. The cam 132 will raise the jack and also the needle so that the hook of the needle will pass by long wrapping finger 34 at the level 133 and will be wrapped with a yarn at that point.

The needle will remain at that elevated position but as butt 129 on the jack strikes against cam 134, the jack will be returned to a low position 135. It is not desirable to select the same jacks which were to wrap by the long fingers at the second stage of selection since it is assumed that a single needle will be wrapped by only one of the yarns. Certain of the plungers 136 may be in a butt engaging position and will raise needles having butts 127 thereon at corresponding levels so that jacks just selected will ride up cam 137 and later cam 138, the corresponding needle being raised to an elevation 139, and then to elevation 140. At the elevation 139 these needles will be wrapped by the short wrapping fingers 30. For purposes of convenience and to clarify the showing, wrapping fingers 34 and 30 have been illustrated at more widely separated positions than they would occupy on the machine. In actual practice both stages of selection would be passed through by all the needles and then needles would move along with their hooks at the elevation 133 or 139 in case they were to be wrapped, and in passing by the wrapping head would have the proper yarns placed in their hooks. There is enough difference in the elevations 133 and 139 so that a needle wrapping by a short finger would also be wrapped by a long finger but would be wrapped below the latch. Cam 141 serves to return jacks and the needles to a slightly lower level after the wrapping has been completed. This particular scheme for selecting needles to wrap at two levels is not a necessary part of the invention since we may use other suitable means for selecting and raising the needles to a predetermined level.

The invention has been described with reference to a particular embodiment thereof and with more or less specific terms, but many changes may occur to those skilled in the art which would fall within the scope of the claims and we are not to be limited except by the terms of said claims.

We claim:

1. In a knitting machine of the rotating needle cylinder type a plurality of independent needles in said cylinder, a wrapping head rotating with said needle cylinder and overlapping the same, said wrapping head having a plurality of yarn guiding means for placing wrap yarns within the hooks of certain preselected needles and wrapping said yarns around said needles, and means for shogging some of said yarn guiding means in one direction in combination with means for shogging adjacent yarn guiding means in the opposite direction.

2. A knitting machine of the circular independent needle type having therein a series of said needles rotatable with a needle cylinder, needle wrapping means rotatable with said cylinder and overlapping the same, said wrapping means including a pair of discs with yarn guiding means individual to each disc by means of which wrap yarns are fed to and wrapped about needles, means for moving one of the discs in one direction in combination with means for selectively moving the other disc in the opposite direction.

3. A knitting machine of the circular independent needle type having a rotatable needle cylinder, an eccentrically mounted wrapping head arranged to overlap the circle of needles included within said cylinder, means for selectively raising certain needles so that said wrapping means may place wrap yarns in the hooks thereof and wrap said yarns about the needles, said wrapping head having a pair of discs each of which has a plurality of yarn guiding fingers depending therefrom, and pattern controlled means for shogging one of the discs and its fingers in one direction and for shogging the other disc in the opposite direction as described.

4. In an independent needle knitting machine a series of latch needles arranged to reciprocate in and rotate with a needle cylinder, an eccentrically mounted wrapping head arranged to overlap said needles and provided with a pair of discs rotatable therewith, said discs carrying yarn guiding means for placing wrap yarns within the hooks of needles and wrapping said yarns about these needles, means for selectively raising some needles to one height and other needles to another height and means under pattern control for shogging one of the discs in one direction and the other disc in the opposite direction.

5. In a knitting machine a rotatable needle cylinder and a series of independent needles rotatable therewith, an eccentrically mounted wrapping head carrying at the lower end thereof a pair of discs rotating in timed relation with said needle cylinder, one disc having long wrapping fingers thereon and the other disc having short wrapping fingers, means for selectively raising some of the needles to a height to be wrapped by the long fingers and means for raising others of the needles to be wrapped by the short fingers in combination with pattern means for shogging one of the discs and its fingers in one direction and the other disc and its fingers in the opposite direction.

6. In a knitting machine a rotatable needle cylinder and a series of independent needles rotatable therewith, an eccentrically mounted wrapping means having a pair of discs rotatable therewith, one of said discs having long wrapping fingers and the other disc having short wrapping fingers depending therefrom, said fingers overlapping the circle of needles to feed yarn into the hooks of certain preselected needles and wrapping said yarn thereabout, means for raising some needles to a height at which they will be wrapped by long fingers and other means for raising needles to a height to be wrapped by the short fingers, cam means slidable upon said wrapping head and controllable from pattern means upon said knitting machine for shogging one of the discs and its fingers in one direction relative to said head, and by continuation of its movement, moving the other disc and its fingers in a direction opposite to that in which the first disc was moved.

7. Wrapping means for feeding wrap threads to the needles of a knitting machine including a spindle, a pair of discs having extensions thereon which telescope within said spindle, means for preventing axial movement of said discs and extensions relative to said spindle, and cam means slidable lengthwise of the spindle for imparting rotational movement of one disc in one direction and of the other disc in the other direction.

8. Wrapping means for feeding wrap threads to needles of a knitting machine including a spindle, a pair of discs having extensions thereon which project upwardly and into said spindle, said discs having yarn guiding means projecting therefrom, pins secured within the extensions of said discs and preventing axial movement between said extension and spindle but allowing a rotative movement between each extension and the spindle, cam means engaging said pins having the cams therein so formed that one disc may be held in fixed position while the opposite is moved in one direction and by further movement thereof the fixed disc may be moved while the second is held relatively stationary.

9. In a wrap stripe knitting machine a rotatable needle cylinder with independent needles therein, a wrapping head rotatable within the said cylinder and arranged to feed wrap yarns to certain preselected needles, the means for feeding said wrap yarns being arranged in pairs for alternately feeding one or another of a pair of wrap yarns to certain needles and means for shogging certain pairs of said means in one direction and other pairs of said means in an opposite direction.

10. In a wrap stripe knitting machine the combination of a rotatable needle cylinder and independent needles therein, a wrapping head eccentric to and rotatable with said cylinder and yarn guiding fingers arranged in pairs on said head movable to and from a position wherein they overlap the circle of needles, means for restraining said fingers from moving to needle overlapping position and cam means located concentric to said wrapping means for selectively moving predetermined ones of said pairs of fingers to an overlapping position.

11. A wrap stripe knitting machine having in combination a rotatable needle cylinder and independent needles therein, an eccentrically mounted wrapping head provided with two series of yarn guiding fingers and means for shogging one of said series of fingers in one direction and the other series in the opposite direction, said fingers further being arranged in pairs and in accordance with pattern control, being moved to overlapping position relative to the circle of needles whereby a yarn in either finger of a pair may be selectively wrapped about any predetermined needles.

12. Wrapping means for wrap stripe knitting machines including a rotatable spindle, two means rotatable therewith each carrying a series of yarn guiding fingers, each said rotatable means being individually movable throughout a limited angular extent relatively to the spindle, means for maintaining either of those rotatable means in a fixed position or moving it angularly in accordance with pattern requirements and other means for selectively moving said guiding fingers to needle overlapping position.

13. Needle wrapping means for wrap stripe knitting machines including a spindle and two series of yarn guiding fingers rotatable in either direction relatively to said spindle, said fingers being arranged in pairs and one series being characterized as long fingers and the other series as short fingers, one finger in each pair having a butt thereon at one level and the other finger in each pair having a butt thereon at a different level, resilient means for urging said fingers inwardly from a needle overlapping position and cam means for engaging butts at a single level to move corresponding fingers to a needle overlapping position in combination with pattern controlled means for moving said cam to and from engagement with butts on either level.

14. Means for wrapping preselected needles in a circular knitting machine, including two series of needle wrapping fingers arranged for rotation relatively to a common supporting spindle, means for shogging either series of fingers away from or towards the other selectively and means for selectively projecting fingers outwardly to a position where they will wrap needles or allowing said fingers to be drawn inwardly to a position wherein they will not wrap needles.

15. In a knitting machine the combination of independent needles and means to feed a body yarn thereto, means for feeding wrap yarns to said needles including means to select predetermined needles to be wrapped and a plurality of fingers for placing wrap yarns about the said selected needles, adjacent pairs of said fingers being so mounted that while in wrapping position with respect to the needles they may be shogged away from and towards each other.

16. A wrapping head for a wrap stripe knitting machine including a spindle, a pair of discs carrying yarn guiding means, each disc being individually rotatable relative to said spindle, means for preventing axial movement of said discs along said spindle and means constructed for restraining said discs from rotating relatively to the spindle, but movable for imparting relative rotary movements between either of said discs and the spindle.

ROBERT H. LAWSON.
ISAAC H. C. GREEN.